(12) United States Patent
Maitre et al.

(10) Patent No.: US 12,459,390 B2
(45) Date of Patent: Nov. 4, 2025

(54) METHOD AND A MASTER CONTROL UNIT FOR CONTROLLING AN ELECTRICAL SYSTEM OF AN ELECTRIC VEHICLE

(71) Applicant: VOLVO TRUCK CORPORATION, Gothenburg (SE)

(72) Inventors: Julien Maitre, Chuzelles (FR); Maxime Valero, Meyzieu (FR); Frederic Leroy, Lyons (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 325 days.

(21) Appl. No.: 17/856,244

(22) Filed: Jul. 1, 2022

(65) Prior Publication Data

US 2023/0010979 A1 Jan. 12, 2023

(30) Foreign Application Priority Data

Jul. 7, 2021 (EP) ..................................... 21184242

(51) Int. Cl.
| | | |
|---|---|---|
| *B60L 3/04* | (2006.01) | |
| *B60L 1/00* | (2006.01) | |
| *B60L 53/53* | (2019.01) | |
| *B60L 53/63* | (2019.01) | |
| *B60L 58/12* | (2019.01) | |
| *B60L 58/14* | (2019.01) | |
| *H02H 3/087* | (2006.01) | |

(52) U.S. Cl.
CPC ............... *B60L 53/63* (2019.02); *B60L 1/006* (2013.01); *B60L 3/04* (2013.01); *B60L 53/53* (2019.02); *B60L 58/12* (2019.02); *B60L 58/14* (2019.02); *H02H 3/087* (2013.01)

(58) Field of Classification Search
CPC .. B60L 1/006; B60L 3/04; B60L 53/53; B60L 53/63; B60L 58/12; B60L 58/14; B60L 2200/40; H02H 3/08; H02H 3/087; H02H 3/26

See application file for complete search history.

(56) References Cited

U.S. PATENT DOCUMENTS

| | | | |
|---|---|---|---|
| 11,710,981 B2 * | 7/2023 | Koenen ............... | H02J 7/00032 307/9.1 |
| 2007/0289794 A1 * | 12/2007 | Ishikawa ................. | B60L 53/24 180/165 |

(Continued)

*Primary Examiner* — Levi Gannon
(74) *Attorney, Agent, or Firm* — Sage Patent Group

(57) ABSTRACT

A method for controlling an electrical system of an electric vehicle. The electrical system comprises a vehicle network and an external network having one or more external loads and connectable to an on-board network. The vehicle network comprises a converter unit adapted for connecting a traction voltage network and an on-board network having a battery unit and one or more internal loads and connected to the converter unit; and a switching unit adapted for controlling power output to the external network by connecting and disconnecting the on-board network and external network. The method comprises the steps of determining at least one current information of the electrical system and at least one safety current value; and controlling the switching unit to control the power output from the on-board network to the external network depending on the at least one current information and the at least one safety current value.

14 Claims, 6 Drawing Sheets

(56) References Cited

U.S. PATENT DOCUMENTS

2018/0164362 A1* 6/2018 Premerlani .......... G01R 31/007
2020/0108819 A1* 4/2020 Revach ................. B60W 20/13
2020/0317057 A1* 10/2020 Salter ..................... B60L 1/006

* cited by examiner

METHOD AND A MASTER CONTROL UNIT FOR CONTROLLING AN ELECTRICAL SYSTEM OF AN ELECTRIC VEHICLE

CROSS-REFERENCE TO RELATED APPLICATIONS

This application claims priority to European Application No. EP 21184242.2 filed on Jul. 7, 2021, the disclosure and content of which is incorporated by reference herein in its entirety.

TECHNICAL FIELD

The invention relates to a method for controlling an electrical system of an electric vehicle. In particular, the invention relates to a method for controlling an electrical system of an electric heavy-duty vehicle. Further, the invention relates to a master control unit for controlling an electrical system of an electric vehicle. In particular, the invention relates to a master control unit for controlling an electrical system of an electric heavy-duty vehicle. Further, the invention relates to a computer program and relates to a computer readable medium carrying a computer program. Moreover, the invention relates to an electrical system of an electric vehicle, in particular an electric heavy-duty vehicle. Finally, the invention relates to an electric vehicle, in particular an electric heavy-duty vehicle.

The invention can be applied in heavy-duty vehicles, such as trucks, buses and construction equipment. In particular, the invention can be applied to a garbage truck, a mixer, a crane or alike. Although the invention will be described—in particular—with respect to a heavy-duty vehicle, the invention is not restricted to this particular vehicle, but may also be used in other vehicles such as a car.

BACKGROUND

KR 101439060 B1 discloses a vehicle battery control apparatus. The vehicle battery control apparatus includes a high voltage battery, a low voltage DC converter, an auxiliary low voltage battery and an electronic load controller. The high-voltage battery is supplied with the voltage that is down from the main power source of the fuel cell or the like, and can supply power to the low-voltage DC converter. The low voltage DC converter may reduce the high voltage received from the high voltage battery to a low voltage to charge the auxiliary low voltage battery. The auxiliary low-voltage battery is charged with electric power supplied from the low-voltage DC converter, and can supply auxiliary electric power to a plurality of electronic loads inside the vehicle. KR 101439060 B1 relates to the field of passenger cars. It does not deal with the problem of external loads (body builder loads) added a posteriori by the vehicle owner.

WO 2019/238 203 A1 discloses a method of operating a vehicle electrical system. The vehicle electrical system includes an electrical power source configured to supply a first DC voltage at a first voltage level and a DC/DC converter coupled to the electrical power source and configured to supply a second DC voltage at a second voltage level that is different from the first voltage level. The method comprises the steps of monitoring a level of current supplied by the DC/DC converter, determining, based on monitoring of the level of the current, that the DC/DC converter is saturated, and in response to determining that the DC/DC converter is saturated, regulating a level of voltage output by the DC/DC converter.

US 2012/0306263 A1 discloses a control device for an electrically powered vehicle, mounted to the electrically powered vehicle. The control device comprises a current control element that takes off a charging current to be supplied to a low voltage battery that supplies power to auxiliary equipment mounted to the electrically powered vehicle in order to charge up the low voltage battery from an output current on the low voltage battery side of a voltage conversion device that performs voltage conversion between voltage of a high voltage battery that, along with supplying power to a motor that propels the electrically powered vehicle and power to the auxiliary equipment, charges up the low Voltage battery and Voltage of the low Voltage battery. The control device further comprises an integrated control unit that determines a charging current value for the charging current based upon accumulated power information related to power accumulated in the low voltage battery and conversion efficiency of the Voltage conversion by the Voltage conversion device, and that controls the current control element so as to take off the charging current specified by the charging current value with the current control element.

U.S. Pat. No. 6,580,180 B2 discloses a power supply apparatus for a vehicle. The vehicle comprises a first battery for supplying power at a first voltage, a second battery for supplying power at a second voltage to a load, a converter between the first battery and the second battery for converting power from the first voltage and the second voltage in magnitude into each other and a controller for operating the converter dependent on a first current in magnitude through the load and a second current in magnitude through the second battery.

However, further improvements are needed. In particular, in existing solutions external loads of the external network cannot be controlled to ensure safe operation of electric vehicles, in particular while the electric vehicle is in motion.

SUMMARY

An object of the invention is to control an external load of an external network to ensure safe operation of electric vehicles, in particular while the electric vehicle is in motion.

The object of the invention is achieved by a method for controlling an electrical system of an electric vehicle, in particular an electric heavy-duty vehicle, according to claim 1.

Preferably the electric vehicle is a hybrid electric vehicle (HEV) or a battery electric vehicle (BEV). Also preferably, the electric vehicle is a plug-in hybrid vehicle (PHEV) or a fuel cell electrical vehicle (FCEV). Such vehicles are also known as dual network vehicles. This is because such vehicles typically comprise an electrical system having an on-board network, also called low voltage network, and a traction voltage network, also known as high voltage network. Usually, the on-board network is a 12V-network, a 24V-network or 48V-network. The traction voltage network may be a 48V-network or at least a 60V-network, in particular a 600V-network. In any case, the voltage of the on-board network is typically lower than the voltage of the traction voltage network.

The electrical system comprises a vehicle network and an external network. The vehicle network comprises a converter unit being adapted for connecting a traction voltage network and an on-board network. Further, the vehicle network comprises the on-board network having a battery unit and one or more internal loads, wherein the on-board network is connected to the converter unit. Finally, the vehicle network comprises a switching unit that is adapted for controlling a power output to the external network by connecting and disconnecting the on-board network and an external network. The external network has one or more external loads, wherein the external network is connectable to the on-board network via the switching unit.

The method comprises the steps of determining at least one current information of the electrical system, determining at least one safety current value, and controlling the switching unit to control the power output from the on-board network to the external network depending on the determined at least one current information of the electrical system and the determined at least one safety current value.

The invention is based on the inventors' findings that that in some situations where the on-board network loads exceed the capacity of the converter unit. This could lead to severe voltage drop on the on-board network leading to a reset of control units. Such a reset of control units can limit safe operation of electric vehicles, in particular if a reset of the control units occurs while the electric vehicle is in motion.

Such safety issues could arise if a battery is disconnected or in case of an open circuit while driving the electric vehicle in combination with a high load activation on the on-board network—for example steering, activation of the air condition or air compression, activation of cooling fans—that could exceed the nominal capacity of the converter unit. Also, a derating convertor unit could lead to a reduced power output on the on-board network with a negative effect on safe operation of the electric vehicle. Further, any issues that could lead to no power output from the converter unit on the on-board network could also limit safe operation of electric vehicles. Furthermore, an over usage of the on-board network loads—for example in case all loads are activated in the same time—limit safe operation of electric vehicles.

All or some of the steps of the method described herein may preferably be performed in the order described herein. Further preferably, all or some of steps of the method described herein may be performed in any order. In particular, all or some of steps of the method described herein may be performed in series or in parallel. For example, for controlling the electrical system of the electric vehicle, some of the steps of the method may be performed in series and other steps of the method may be performed in parallel.

The method as described has the effect to control the external loads of the external network by controlling the switching unit. Thereby, safe operation of electric vehicles, in particular while the electric vehicle is in motion, is increased in comparison to known solutions. Further, the method described herein has the effect to dynamically control the external loads of the external network through information received from the converter unit, battery current information—for example through battery sensor—and current information of the external network.

As to the advantages, preferred embodiments and details of the method, reference is made to the corresponding aspects and embodiments of the master control unit, computer program comprising program code, computer readable medium carrying a computer program, electric system, and of the electric vehicle described herein below.

According to a preferred embodiment, the vehicle network comprises a traction voltage network having one or more traction electric motors for driving the electric vehicle and/or an electric storage system and/or loads. Preferably, the at least one safety current value is a current protection value. Further preferably, the at least one safety current value is a limitation value. Alternatively, it may also be preferred that the at least one safety current value is a current protection value and a limitation value.

Further preferably, alternatively or additionally, the at least one current information of the electrical system a status information of the converter unit and/or a battery current value of the battery of the on-board network and/or an external load current consumption value of the external network. Most preferably, the at least one current information of the electrical system is a status information of the converter unit, a battery current value of the battery of the on-board network and an external load current consumption value of the external network. Preferably, the status information of the converter unit is at least an operation status of the converter unit and/or an actual converter output current and/or a maximum converter current capacity value.

According to a further preferred embodiment of the method, the step of controlling the power output from the on-board network to the external network comprises the step of closing the switching unit for connecting the on-board network with the external network and/or the step of opening the switching unit for disconnecting the on-board network from the external network and/or the step of discrete or continuous adjustment of the switching unit for discrete or continuous adjustment of the output power.

In particular, the effect of this preferred embodiment is a downgraded function of the external load of the external network.

In a further preferred embodiment, the one or more internal loads are one or more non-critical internal loads and/or one or more critical internal loads. In this preferred embodiment, the method comprises the step of controlling the one or more non-critical internal loads depending on the determined at least one current information of the electrical system. Preferably, the step of controlling the one or more non-critical internal loads comprises connecting and/or disconnecting the one or more non-critical internal loads from the on-board network. Further, preferably, additionally or alternatively, the step of controlling the one or more non-critical internal loads comprises the step of discrete or continuous adjustment of the one or more non-critical internal loads.

In particular, the effect of this preferred embodiment is to switch off internal loads such as coffee maker, fridge, appliance socket (e.g.: USB socket, cigarette lighter socket, grid inverter) or to limit cooling fan, limit assistance torque for front or rear steering or alike.

According to another preferred embodiment, the switching unit is closed if the determined operation status of the converter unit signals full readiness for operation, and the determined battery current value signals that the battery is connected to the on-board network and under charge and the determined actual converter output current minus the determined battery current value is below a threshold of the determined maximum converter current capacity value.

Additionally or alternatively it is preferred that the switching unit is opened if the determined operation status of the converter unit does not signal readiness for operation.

In particular, it may be preferred that the switching unit is controlled discretely or continuously to discretely or continuously control the output power if the determined operation status of the converter unit signals partial readiness for operation and/or the determined battery current value signals that the battery is not connected to the on-board network and/or not under charge.

Alternatively, it may be preferred that the switching unit is controlled discretely or continuously to discretely or continuously control the output power if the determined operation status of the converter unit signals full readiness for operation, and the determined battery current value signals that the battery is connected to the on-board network and under charge and the determined actual converter output current minus the determined battery current value is above the threshold of the determined maximum converter current capacity value.

In a further preferred embodiment of the method, the step of determining at least one safety current value comprises the sub-step of defining a minimum and/or maximum safety current value Alternatively or additionally the step of determining at least one safety current value comprises the sub-step of determining the at least one safety current value as maximum safety current value if the determined operation status of the converter unit signals full readiness for operation, and the determined battery current value signals that the battery is connected to the on-board network and under charge and the determined actual converter output current minus the determined battery current value is below the threshold of the determined maximum converter current capacity value.

Further preferably, additionally or alternatively, the step of determining at least one safety current value comprises the sub-step of determining the at least one safety current value as minimum safety current value if the determined operation status of the converter unit does not signal readiness for operation; and/or the determined battery current value signals that the battery is connected to the on-board network and/or under discharge Furthermore, it may additionally or alternatively be preferred the step of determining at least one safety current value comprises the sub-step of determining the at least one safety current value as a minimum of the sum of the determined maximum converter current capacity value minus the determined actual converter output current plus the determined battery current value plus the external load current consumption value and the maximum safety current value if the determined operation status of the converter unit signals partial readiness for operation and/or the determined battery current value signals that the battery is not connected to the on-board network and/or under discharge;

Additionally it may be preferred that the step of determining at least one safety current value comprises the sub-step of determining the at least one safety current value as a minimum of the sum of the determined maximum converter current capacity value minus the determined actual converter output current plus the determined battery current value plus the external load current consumption value and the maximum safety current value if the determined operation status of the converter unit signals full readiness for operation, and the determined battery current value signals that the battery is connected to the on-board network and under charge and the determined actual converter output current minus the determined battery current value is above the determined at least one safety current value.

Further, the object of the invention is achieved by a master control unit for controlling an electrical system of an electric vehicle, in particular an electric heavy-duty vehicle, wherein the master control unit is configured to perform the steps of the method described herein.

In particular, the object of the invention is achieved by a computer program comprising program code means for performing the steps of the method described herein when said program is run on the master control unit described before.

Further, the object of the invention is achieved by a computer readable medium carrying a computer program comprising program code means for the steps of the method described herein when said program product is run on the master control unit described before.

In another aspect, the object of the invention is achieved by an electrical system of an electric vehicle, in particular an electric heavy-duty vehicle, the electrical system comprising a vehicle network, wherein the vehicle network comprises a converter unit being adapted for connecting a traction voltage network and an on-board network; and an on-board network having a battery unit and one or more internal loads, wherein the on-board network is connected to the converter unit; the electrical system further comprising an external network having one or more external loads, wherein the external network is connectable to the on-board network via a switching unit; wherein the vehicle network comprises the switching unit for controlling a power output to the external network, wherein the switching unit is adapted for connecting and disconnecting the on-board network and an external network depending on at least one determined current information of the electrical system and a determined at least one safe-ty current value, and a master control unit described before that is being signal-coupled with the electrical system and adapted for controlling the electrical system, in particular the switching unit.

In a preferred embodiment, the vehicle network comprises the traction voltage network having one or more traction electric motors for driving the electric vehicle and/or an electric storage system and/or loads; and/or wherein the switching unit is an electrical switch, in particular a relay, and/or a transistor, in particular a MOSFET.

According to a further preferred embodiment, the master control unit is signal-coupled with the switching unit and/or the converter unit and/or the on-board network.

In another preferred embodiment, the electrical system comprises a vehicle control unit that is adapted for controlling one or more internal loads, in particular one or more non-critical internal loads, of the on-board network, wherein preferably the vehicle control unit is configured to perform the steps of the method described herein.

In a further preferred embodiment, the vehicle control unit is signal-coupled with the converter unit and/or the on-board network and/or the one or more internal loads, in particular one or more non-critical internal loads.

According to another aspect, the object of the invention is achieved by an electric vehicle, in particular an electric heavy-duty vehicle, comprising an electrical system described herein.

As to the advantages, preferred embodiments and details of the master control unit computer program comprising program code, computer readable medium carrying a computer program, electric system, and of the electric vehicle, reference is made to the corresponding aspects and embodiments of the method described herein above.

BRIEF DESCRIPTION OF THE DRAWING

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
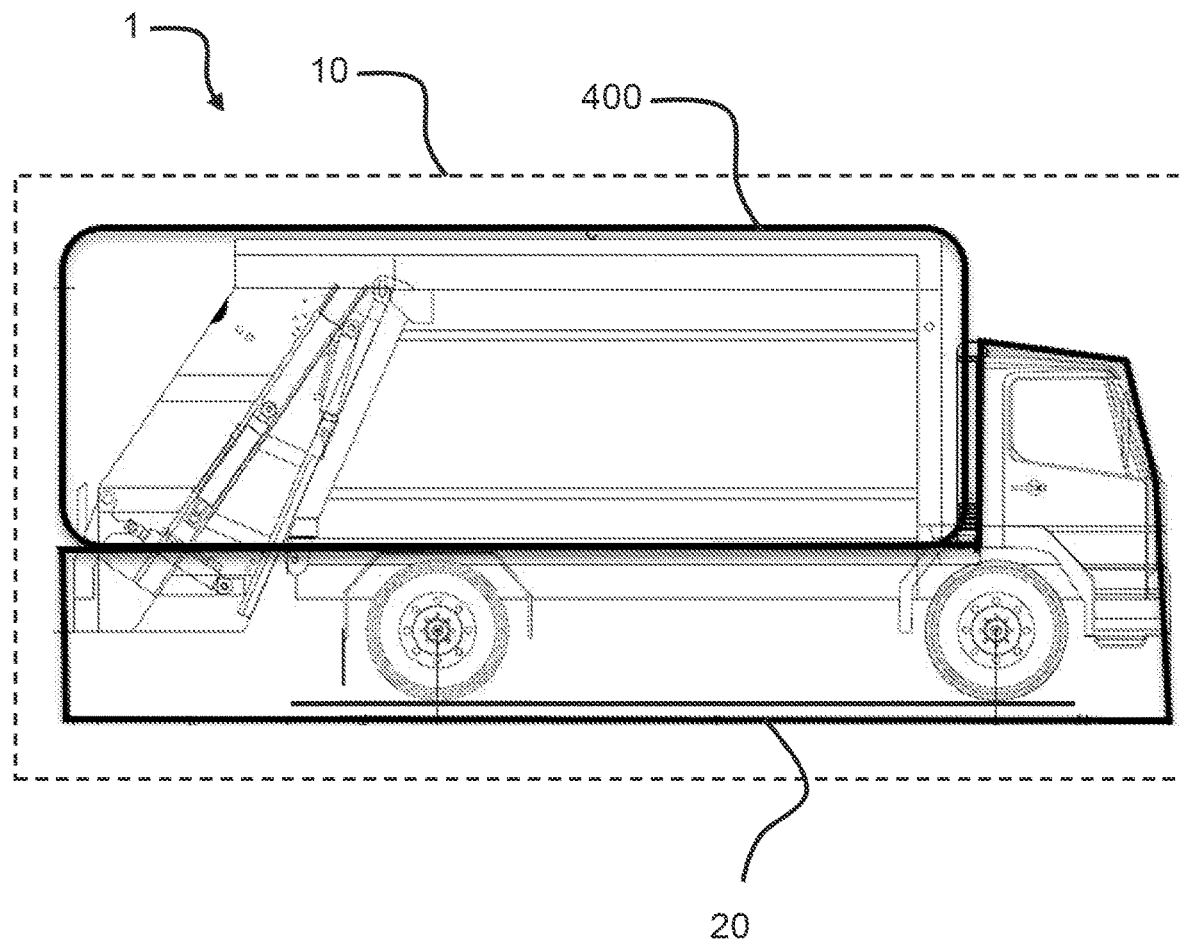
FIG. 1 is a side view of an electric heavy-duty vehicle comprising an electric system.

FIG. 1 represents an electric heavy-duty vehicle 1 In the example, the electric heavy-duty vehicle 1 is a garbage truck. The electric heavy-duty vehicle 1 comprises an electrical system 10. Such an electrical system 10 comprises a vehicle network 20 and an external network 400.

Figure 2:
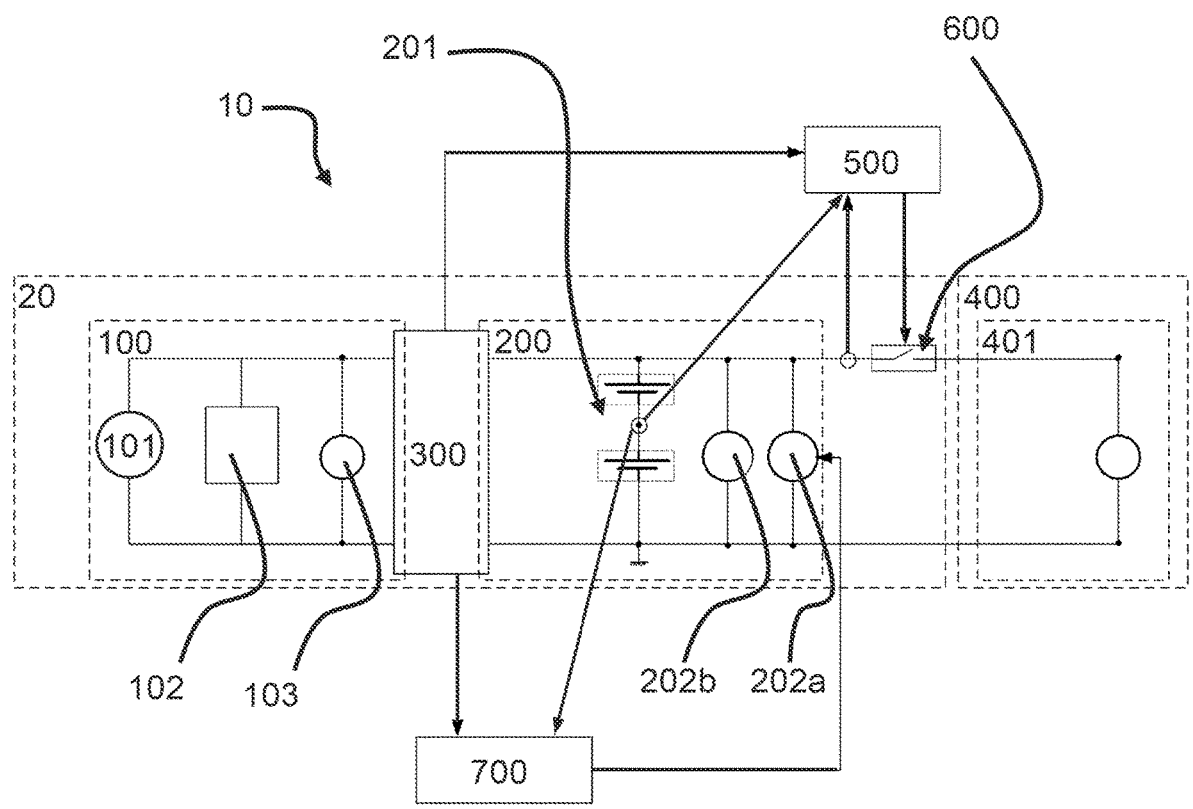
FIG. 2 is a detailed view of an electric system of the electric heavy-duty vehicle of FIG. 1.

FIG. 2 is a detailed view of an electric system of the electric heavy-duty vehicle of FIG. 1. The vehicle network 20 comprises a converter unit 300 and an on-board network 200. The on-board network 200 comprises a battery unit 201 and one or more internal loads 202a, 202b. The on-board network 200 and the converter unit 300 are connected. The converter unit 300 is adapted for connecting a traction voltage network 100 and an on-board network 200. The traction voltage network 100 comprises electric motors 101, an electric storage system 102 and traction loads 103. Further, the vehicle network 20 comprises a switching unit 600. The switching unit 600 is an electrical switch, in particular a relay, and/or a transistor, in particular a MOSFET.

By means of the switching unit 600 a power output to the external network 400 can be controlled. For this purpose, the switching unit 600 is adapted for connecting and disconnecting the on-board network 200 and an external network 400. In fact, the switching unit 600 connects and disconnects the external network 400 from the on-board network 200 depending on at least one determined current information of the electrical system 10 and a determined at least one safety current value. Such an external network 400 may have one or more external loads 401.

Further, the electric system 10 comprises a master control unit 500. The master control unit 500 is signal-coupled with the electrical system 10, in particular the switching unit 600, the converter unit 300, and the on-board network 200. The master control unit 500 is adapted for controlling an electrical system 10 of an electric heavy-duty vehicle 1, in particular its switching unit 600.

Additionally, but not compulsory, the electrical system 10 may comprise a vehicle control unit 700. The vehicle control unit 700 is signal-coupled with the converter unit 300, the on-board network 200, and one non-critical internal load 202a. The vehicle control unit 700 is adapted for controlling one or more internal loads 202, in particular one or more non-critical internal loads 202a, of the on-board network 200.

Both, the master control unit 500 and the vehicle control unit 700 are configured to perform the steps of a method for controlling an electrical system 10 of the electric heavy-duty vehicle 1.

Figure 3:
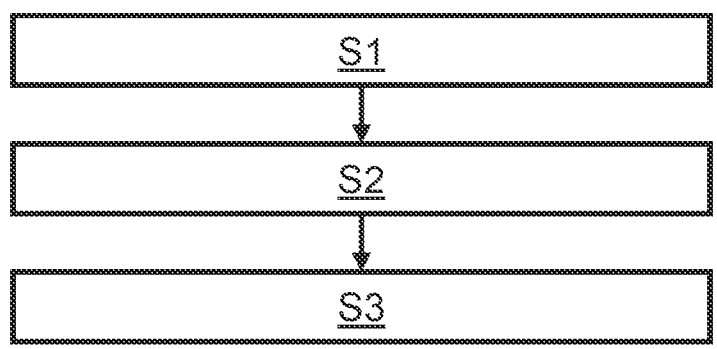
FIG. 3 is a first embodiment of a schematic flow diagram of a method for controlling an electrical system of FIG. 2.

FIG. 3 is a first embodiment of a schematic flow diagram of the method for controlling an electrical system of FIG. 2. The method comprises three steps.

Firstly, the method comprises the step of determining S1 at least one current information of the electrical system 10. The at least one current information of the electrical system 10 is a status information of the converter unit and/or a battery current value of the battery of the on-board network 200 and/or an external load current consumption value of the external network 400. Preferably, the status information of the converter unit 300 is at least one of the following: an operation status of the converter unit 300; an actual converter output current; and/or a maximum converter current capacity value.

Secondly, the method comprises the step of determining S2 at least one safety current value. The at least one safety current value is a current protection value and/or a limitation value.

Thirdly, the method comprises the step of controlling S3 the switching unit 600 to control the power output from the on-board network 200 to the external network 300 depending on the determined at least one current information of the electrical system 10 and the determined at least one safety current value. The step of controlling S3 the power output from the on-board network 200 to the external network 300 comprises closing the switching unit 600 for connecting the on-board network 200 with the external network 400. Additionally or alternatively, the step of controlling S3 the power output from the on-board network 200 to the external network 300 comprises opening the switching unit 600 for disconnecting the on-board network 200 from the external network 400. Also, a discrete or continuous adjustment of the switching unit 600 for discrete or continuous adjustment of the output power may be preferred.

The switching unit 600 is closed if the determined operation status of the converter unit 300 signals full readiness for operation, and the determined battery current value signals that the battery is connected to the on-board network 200 and under charge and the determined actual converter output current minus the determined battery current value is below a threshold of the determined maximum converter current capacity value. The switching unit 600 is opened if the determined operation status of the converter unit 300 does not signal readiness for operation.

The switching unit 600 is controlled discretely or continuously to discretely or continuously control the output power if the determined operation status of the converter unit 300 signals partial readiness for operation and/or the determined battery current value signals that the battery is not connected to the on-board network 200 and/or not under charge. Alternatively, the switching unit 600 is controlled discretely or continuously to discretely or continuously control the output power if the determined operation status of the converter unit 300 signals full readiness for operation, and the determined battery current value signals that the battery is connected to the on-board network 200 and under charge and the determined actual converter output current minus the determined battery current value is above the threshold of the determined maximum converter current capacity value.

Figure 4:
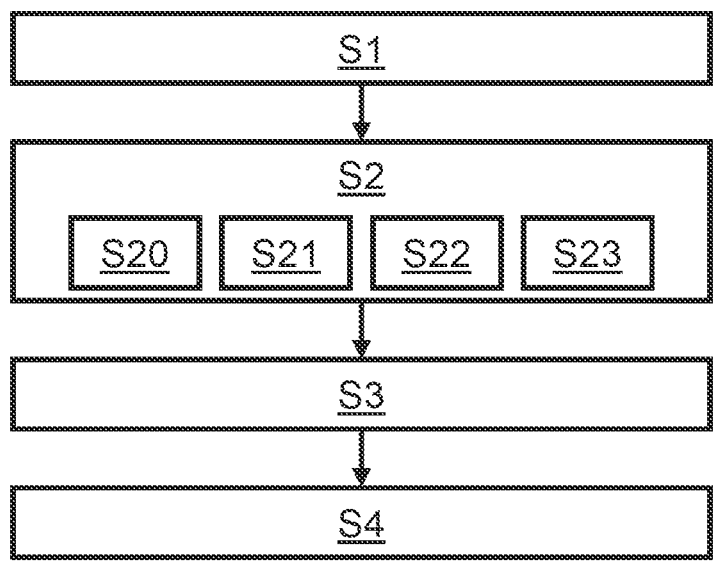
FIG. 4 is a second embodiment of a schematic flow diagram of a method for controlling an electrical system of FIG. 2.

FIG. 4 is a second embodiment of a schematic flow diagram of the method for controlling an electrical system of FIG. 2. The method comprises four steps. The second embodiment of the method schematically shown in FIG. 4 is based on the first embodiment of the method schematically shown in FIG. 3. The second embodiment of the method additionally comprises the step of controlling S4 the one or more non-critical internal loads 202a depending on the determined at least one current information of the electrical system. Preferably, the step of controlling S4 the one or more non-critical internal loads 202a comprises a sub-step of connecting and/or disconnecting the one or more non-critical internal loads 202a from the on-board network 200. Additionally or alternatively, the step of controlling S4 the one or more non-critical internal loads 202a comprises a sub-step of discrete or continuous adjustment of the one or more non-critical internal loads 202a.

In the second preferred embodiment shown in FIG. 4 the step of determining S2 at least one safety current value may comprise at least one of the four following sub-steps: A first sub-step is defining S20 a minimum and/or maximum safety current value. Alternatively or additionally, the second and third sub-steps are determining the at least one safety current value as maximum safety current value S21 and/or determining the at least one safety current value as minimum safety current value S22. Finally, the fourth sub-step is determining the at least one safety current value as a minimum S23 of the sum of the determined maximum converter current capacity value minus the determined actual converter output current plus the determined battery current value plus the external load current consumption value and the maximum safety current value.

The at least one safety current value is determined as maximum safety current value S21 if the determined operation status of the converter unit 300 signals full readiness for operation, and the determined battery current value signals that the battery is connected to the on-board network 200 and under charge and the determined actual converter output current minus the determined battery current value is below the threshold of the determined maximum converter current capacity value. The at least one safety current value is determined as minimum safety current value S22 if the determined operation status of the converter unit 300 does not signal readiness for operation; and/or the determined battery current value signals that the battery is connected to the on-board network 200 and/or under discharge.

The at least one safety current value is determined as minimum safety current value S23 of the sum of the determined maximum converter current capacity value minus the determined actual converter output current plus the determined battery current value plus the external load current consumption value and the maximum safety current value if the determined operation status of the converter unit 300 signals partial readiness for operation and/or the determined battery current value signals that the battery is not connected to the on-board network 200 and/or under discharge. Alternatively, the at least one safety current value is determined as minimum safety current value S23 of the sum of the determined maximum converter current capacity value minus the determined actual converter output current plus the determined battery current value plus the external load current consumption value and the maximum safety current value if the determined operation status of the converter unit 300 signals full readiness for operation, and the determined battery current value signals that the battery is connected to the on-board network 200 and under charge and the determined actual converter output current minus the determined battery current value is above the determined at least one safety current value.

So generally speaking, if a severe issue is detected—as described above—on a vehicle network leading to a stop of operation of the converter unit 300, the power output from the on-board network 200 to the external network 300 is controlled by opening the switching unit 600, to limit as much as possible the current consumption on the on-board network (that will be supplied from batteries). In parallel, other non-safety high power loads—i.e. for example non-critical internal loads 202a—can be cut-off. This can be directly controlled from a vehicle control unit 700. This in order to ensure a safe stop of the electric vehicle 1.

Figure 5:
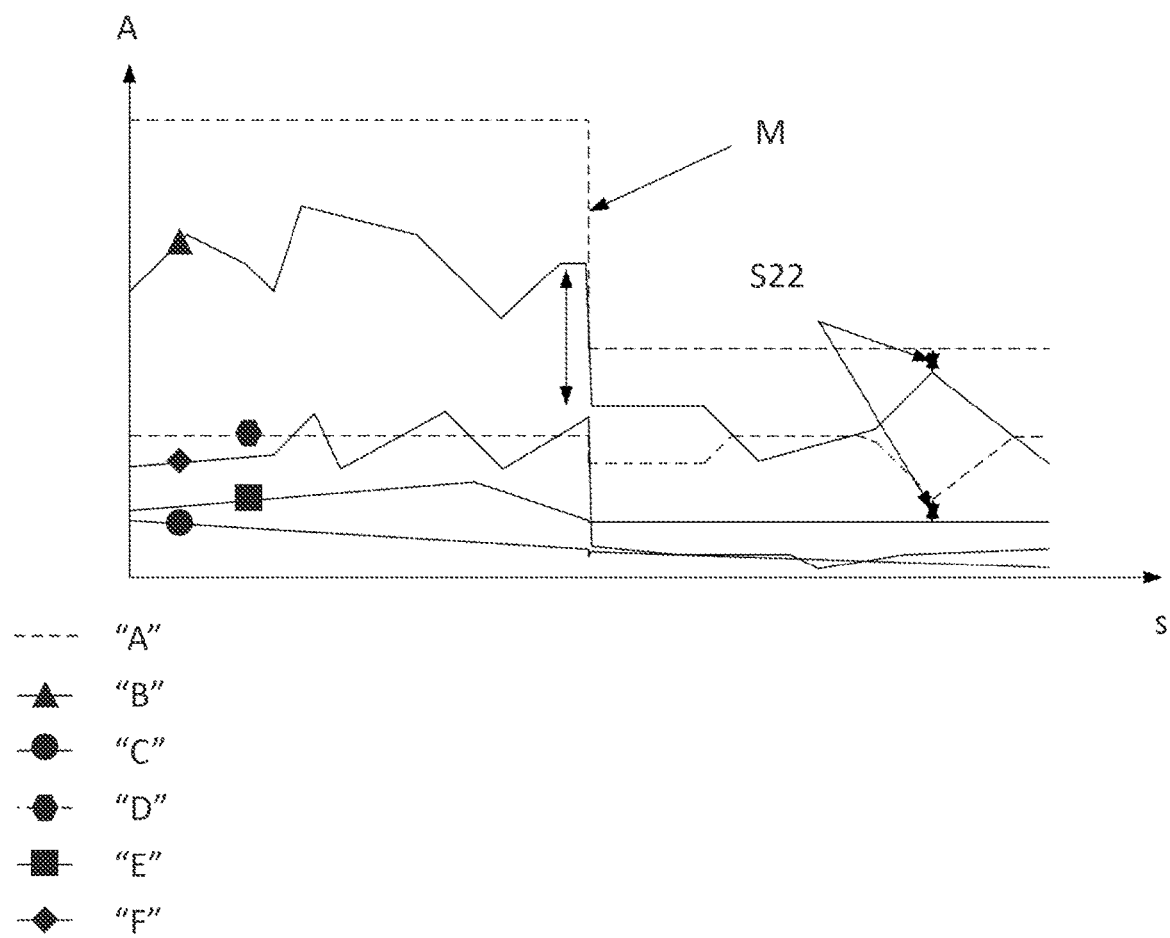
FIG. 5 is a first use case (partial readiness for operation of the converter unit) of a schematically illustration when a severe issue occurs with an associated reaction of the electric system.
Figure 6:
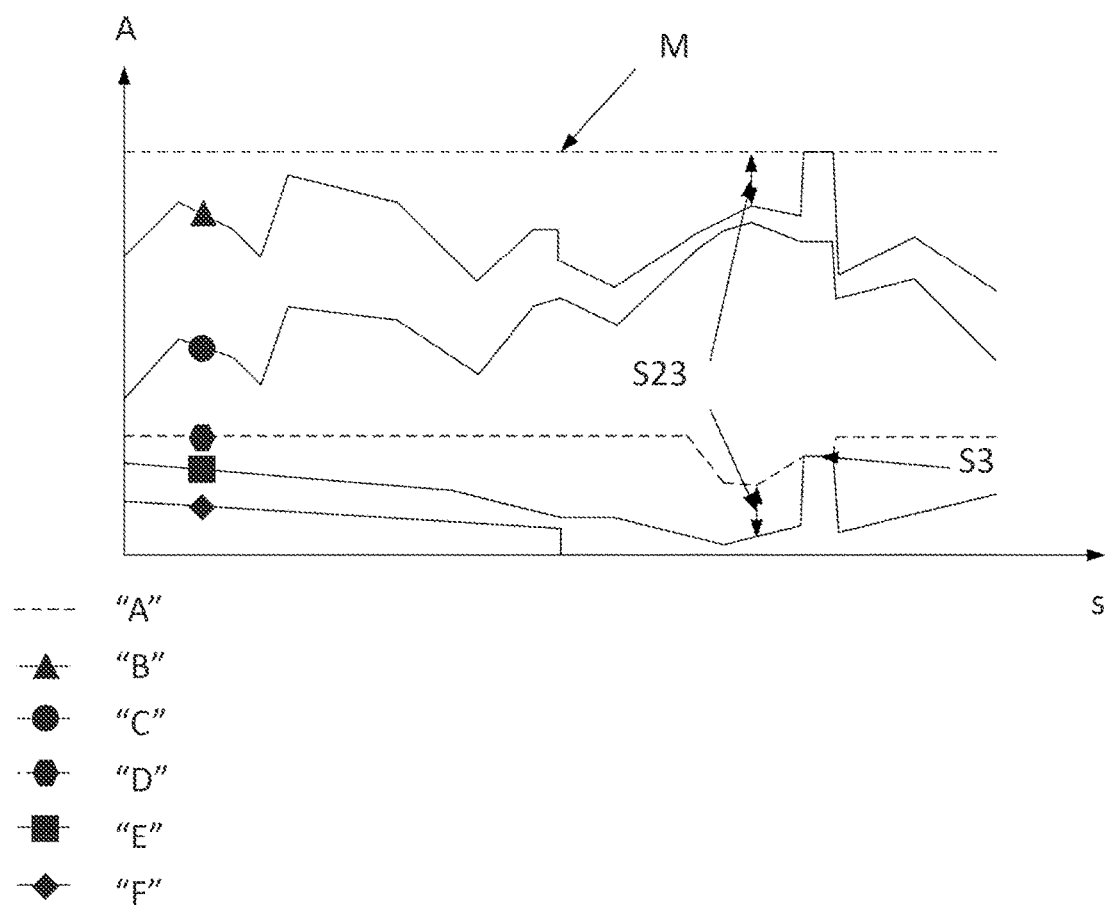
FIG. 6 is a second use case (disconnected battery unit) of a schematically illustration when a severe issue occurs with an associated reaction of the electric system.

FIGS. 5 and 6 schematically illustrate two use cases when a severe issues M occurs with an associated reaction of the electric system 10, respectively of the method for controlling the electrical system 10 of the electric vehicle 1.

FIG. 5 refers to a first use case, schematically illustrates the maximum converter current capacity value "A", the actual converter output current "B", the battery current value of the battery of the on-board network "C", the safety current value "D", the external load current consumption value of the external network "E", and the non-critical internal load current "F" over time if a severe issue M is detected as described above. In case of the first use case, the severe issue detected M is a malfunctioning converter unit 300 that is derated. With regard to the first use case, to control the electric vehicle 1, the at least one safety current value is determined as minimum safety current value S22 as the determined operation status of the converter unit 300 signals its non-readiness for operation.

FIG. 6 refers to a second use case, schematically illustrates the maximum converter current capacity value "A", the actual converter output current "B", the battery current value of the battery of the on-board network "F", the safety current value "D", the external load current consumption value of the external network "E", and a vehicle load current (without external loads) "C" over time if a severe issue M is detected as described above. In case of the second use case, the severe issue detected M is a detected low voltage battery open circuit in the on-board network 200. With regard to the second use case, to control the electric vehicle 1, the at least one safety current value is determined as minimum of the sum of the determined maximum converter current capacity value minus the determined actual converter output current plus the determined battery current value plus the external load current consumption value and the maximum safety current value as the determined battery current value signals that the battery is not connected to the on-board network 200. Further, at some time, the switching unit is controlled S3 in order to control the power output from the on-board network to the external network as the consumption value of the external network "E" would otherwise exceed the determined safety current value "D".

REFERENCE SIGNS 1 electric vehicle/electric heavy-duty vehicle
10 electrical system
20 vehicle network
100 traction voltage network
101 electric motors
102 electric storage system
103 traction loads
200 on-board network
201 battery unit
202a, 202b (non-critical and critical) internal loads
300 converter unit
400 external network
401 external loads
500 master control unit
600 switching unit
700 electric vehicle control unit
S1 determining at least one current information of the electrical system
S2 determining at least one safety current value S3 controlling the switching unit to control the power output from the on-board network to the external network S4 controlling the one or more non-critical internal loads

The invention claimed is:

1. A method for controlling an electrical system of an electric vehicle, the electrical system comprising:
   a vehicle network, the vehicle network comprising:
      a converter unit being adapted for connecting a traction voltage network and an on-board network;
      the on-board network having a battery unit and one or more internal loads, wherein the on-board network is connected to the converter unit, wherein the on-board network has a voltage lower than the voltage of the traction voltage network;
      a switching unit that is adapted for controlling a power output to an external network by connecting and disconnecting the on-board network and the external network;
      the external network having one or more external loads, wherein the external network is connectable to the on-board network via the switching unit; and
   the method comprising the steps of:
      determining at least one current information of the electrical system;
      determining at least one safety current value; and
      controlling the switching unit to control the power output from the on-board network to the external network depending on the determined at least one current information of the electrical system and the determined at least one safety current value,
   wherein the method is performed while the electric vehicle is in motion, wherein the vehicle network comprises the traction voltage network having one or more traction electric motors for driving the electric vehicle and an electric storage system.

2. The method according to previous claim 1, further comprising:
   wherein the vehicle network comprises loads; and/or
   wherein the at least one safety current value is at least one of the following:
      a current protection value; and/or
      a limitation value; and/or
   wherein the at least one current information of the electrical system is at least one of the following:
      a status information of the converter unit, the status information of the converter unit comprising at least one of the following:
         an operation status of the converter unit; and/or
         an actual converter output current; and/or
         a maximum converter current capacity value; and/or
         a battery current value of the battery unit of the on-board network; and/or
         an external load current consumption value of the external network.

3. The method according to claim 1, wherein the step of controlling the power output from the on-board network to the external network comprises:
   closing the switching unit for connecting the on-board network with the external network; and/or
   opening the switching unit for disconnecting the on-board network from the external network; and/or
   discrete or continuous adjustment of the switching unit for discrete or continuous adjustment of output power.

4. A method according to claim 1, wherein the one or more internal loads are one or more non-critical internal loads and/or one or more critical internal loads; the method further comprising:
   controlling the one or more non-critical internal loads depending on the determined at least one current information of the electrical system, wherein
   the step of controlling the one or more non-critical internal loads comprises:
      connecting and/or disconnecting the one or more non-critical internal loads from the on-board network; and/or
      discrete or continuous adjustment of the one or more non-critical internal loads.

5. The method according to claim 1, wherein
the switching unit is closed if
   a determined operation status of the converter unit signals full readiness for operation, and
   a determined battery current value signals that the battery is connected to the on-board network and under charge and
   a determined actual converter output current minus the determined battery current value is below a threshold of a determined maximum converter current capacity value; and/or
the switching unit is opened if
   the determined operation status of the converter unit does not signal readiness for operation; and/or
the switching unit is controlled discretely or continuously to discretely or continuously control output power if
   the determined operation status of the converter unit signals partial readiness for operation and/or
   the determined battery current value signals that the battery is not connected to the on-board network and/or not under charge;
or
   the determined operation status of the converter unit signals full readiness for operation, and
   the determined battery current value signals that the battery is connected to the on-board network and under charge and
   the determined actual converter output current minus the determined battery current value is above the threshold of the determined maximum converter current capacity value.

6. The method according to claim 1, further comprising:
   wherein the step of determining at least one safety current value comprises:
      defining a minimum and/or maximum safety current value; and/or
      determining the at least one safety current value as maximum safety current value if
         a determined operation status of the converter unit signals full readiness for operation, and
         a determined battery current value signals that the battery is connected to the on-board network and under charge and
         a determined actual converter output current minus the determined battery current value is below the threshold of a determined maximum converter current capacity value; and/or
      determining the at least one safety current value as minimum safety current value if
         the determined operation status of the converter unit does not signal readiness for operation; and/or the determined battery current value signals that the battery is connected to the on-board network and/or under discharge; and/or determining the at least one safety current value as a minimum of the sum of the determined maximum converter current capacity value minus the determined actual converter output current plus the determined battery current value plus an external load current consumption value and the maximum safety current value if the determined operation status of the converter unit signals partial readiness for operation and/or the determined battery current value signals that the battery is not connected to the on-board network and/or under discharge;

or the determined operation status of the converter unit signals full readiness for operation, and the determined battery current value signals that the battery is connected to the on-board network and under charge and the determined actual converter output current minus the determined battery current value is above the determined at least one safety current value.

7. A master control unit for controlling an electrical system of an electric vehicle, wherein the master control unit is configured to perform the steps of the method according to claim 1.

8. An electrical system of an electric vehicle comprising:
a vehicle network, the vehicle network comprising:
a converter unit being adapted for connecting a traction voltage network and an on-board network;
an on-board network having a battery unit and one or more internal loads, wherein the on-board network is connected to the converter unit, wherein the on-board network has a voltage lower than the voltage of the traction voltage network;
an external network having one or more external loads, wherein the external network is connectable to the on-board network via a switching unit;
the vehicle network comprises the switching unit for controlling a power output to the external network, wherein the switching unit is adapted for connecting and disconnecting the on-board network and an external network depending on at least one determined current information of the electrical system and a determined at least one safety current value, wherein the vehicle network comprises a traction voltage network having one or more traction electric motors for driving the electric vehicle and an electric storage system; and
a master control unit according to claim 7 that is being signal-coupled with the electrical system and adapted for controlling the electrical system.

9. The electrical system according to claim 8,
wherein the vehicle network comprises loads; and/or
wherein the switching unit is an electrical switch, and/or a transistor.

10. The electrical system according to claim 8, wherein the master control unit is signal-coupled with the switching unit and/or the converter unit and/or the on-board network.

11. The electrical system according to claim 8, comprising a vehicle control unit adapted for controlling one or more internal loads of the on-board network, wherein the vehicle control unit is configured to perform the steps of the method according to claim 1.

12. The electrical system according to previous claim 11, wherein the vehicle control unit is signal-coupled with the converter unit and/or the on-board network and/or the one or more internal loads.

13. An electric vehicle comprising an electrical system according to claim 8.

14. A computer program product comprising a computer readable medium having program code stored thereon, wherein when executed by a master control unit, the program code cause the master control unit to execute the method as claimed in claim 1.

* * * * *